(No Model.)

D. F. PULLEY.
PLANTER.

No. 352,629. Patented Nov. 16, 1886.

Witnesses.
A. Ruppert,
C. E. Grant.

Inventor:
D. F. Pulley,
Per
Thomas P. Simpson,
atty.

UNITED STATES PATENT OFFICE.

DAVID F. PULLEY, OF MALAKOFF, TEXAS.

PLANTER.

SPECIFICATION forming part of Letters Patent No. 352,629, dated November 16, 1886.

Application filed August 2, 1886. Serial No. 209,815. (No model.)

*To all whom it may concern:*

Be it known that I, DAVID F. PULLEY, a citizen of the United States, residing at Malakoff, in the county of Henderson and State of Texas, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claims.

Figure 1:
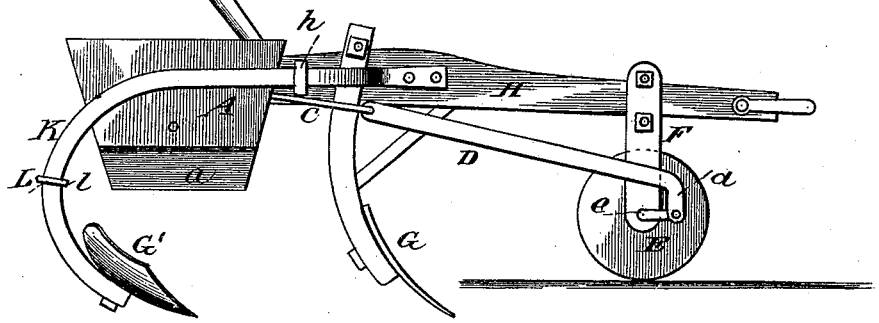
Figure 2:
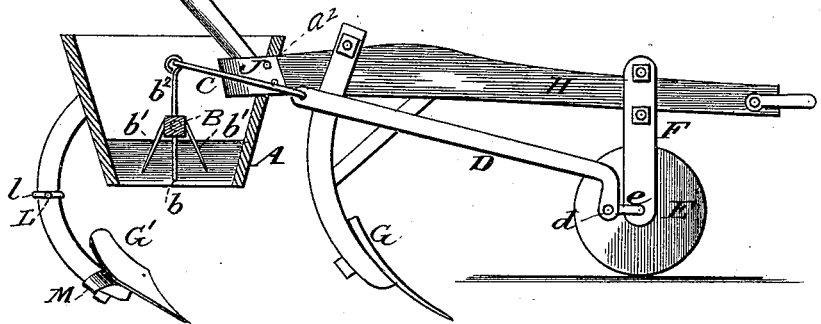
Figure 3:
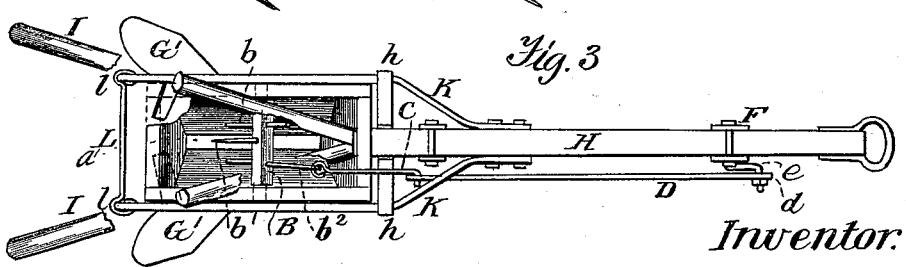

Figure 1 of the drawings is a side elevation; Fig. 2, a longitudinal vertical section; Fig. 3, a plan view.

In the drawings, A represents the seed-hopper, having the tapered and longitudinally-slotted bottom $a'$, through which the seed is dropped.

B is a vibratory shaft journaled across the hopper and provided with the long median arms $b\ b$, placed at an angle of about forty-five degrees from each other, so that their ends will move directly over slot $a'$, while on each side of these median arms is an auxiliary short arm, $b'$, the latter causing the seed to move toward the slot and the arms $b$ causing them to drop therethrough.

In order to vibrate the shaft B, I use the arm $b^2$ on the upper side thereof, a pivoted rod, C, a pitman, D, angled at $d$, and a crank, $e$, on the shaft of ground-wheel E, which is journaled in the hangers F F.

As the team moves along the median plow G opens the furrow, the seed is drilled into it by the dropper mechanism, and the rear plows, G' G'—one on each side—cover up the seed.

The hopper A has a front hole, $a^2$, into which enters the rear end of the beam H, the handles I I being detachably fastened in a clip, J, on the rear end of beam. The plow-standards K K are made elastic, fastened at the front ends to the sides of the beam, supported in beam-bows $h\ h$, and clamped to the sides of the hopper by the rod L, having eyes $l\ l$, through which pass the standards K K. This construction effectually supports the hopper and firmly holds the plows at the proper distance apart, while by simply sliding down the eye-rod L and detaching the handles the hopper may be removed, so that the implement can be used as a cultivator having three teeth. By removing one plow it may be used as a double shovel, one of the two covering-plows being moved a little forward of the other, the beam bows or braces securely holding them. With a small plow in front and the turning-plows behind, it will list up land very nicely.

In order to straddle and cultivate cotton, I use the little inside wings, M M, projecting toward each other, so as to bar off and dirt up at the same time.

Having thus described my invention with all that is necessary to a full understanding thereof, what I claim as new, and desire to protect by Letters Patent, is—

1. The combination, with the beam H, of a hopper having the front hole, $a^2$, the elastic standards K K, beam bows or braces $h\ h$, and the eye-rod L, as and for the purpose set forth.

2. The handles I I of a planter, secured detachably in a clip, J, on the end of the beam H and just within the front of the hopper A, as shown and described.

In testimony whereof I affix my signature in presence of two witnesses.

D. F. PULLEY.

Witnesses:
    C. F. SCOTT,
    D. JOHNSON.